(12) United States Patent
Ische et al.

(10) Patent No.: US 8,700,049 B2
(45) Date of Patent: Apr. 15, 2014

(54) SYSTEM AND/OR METHOD FOR REDUCING INITIAL POSITION UNCERTAINTY IN SPS OPERATION

(75) Inventors: Marc Ische, San Diego, CA (US); Lalitaprasad V. Daita, San Jose, CA (US); Thomas K. Rowland, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1239 days.

(21) Appl. No.: 12/106,122

(22) Filed: Apr. 18, 2008

(65) Prior Publication Data

US 2009/0264136 A1    Oct. 22, 2009

(51) Int. Cl.
| | | |
|---|---|---|
| *H04W 24/00* | (2009.01) | |
| *H04W 36/00* | (2009.01) | |
| *H04W 4/00* | (2009.01) | |
| *G01S 19/42* | (2010.01) | |
| *G01S 19/25* | (2010.01) | |
| *G01S 19/46* | (2010.01) | |
| *G01S 3/02* | (2006.01) | |

(52) U.S. Cl.
USPC .......... 455/456.1; 455/404.2; 455/456.2; 455/456.5; 455/440; 455/434; 342/357.25; 342/357.64; 342/357.29; 342/465; 370/328

(58) Field of Classification Search
USPC .................................................. 455/456.1
See application file for complete search history.

(56) References Cited

U.S. PATENT DOCUMENTS

| | | | |
|---|---|---|---|
| 6,075,987 A | 6/2000 | Camp, Jr. et al. | |
| 6,148,202 A | 11/2000 | Wortham | |
| 6,222,483 B1 | 4/2001 | Twitchell et al. | |
| 6,289,280 B1 | 9/2001 | Fernandez-Corbaton et al. | |
| 6,515,620 B1 | 2/2003 | Jandrell | |
| 6,774,842 B2 | 8/2004 | Syrjarinne | |
| 6,865,395 B2 | 3/2005 | Riley | |
| 6,891,500 B2 | 5/2005 | Hall et al. | |
| 7,053,826 B1 | 5/2006 | McBurney et al. | |

(Continued)

FOREIGN PATENT DOCUMENTS

| | | |
|---|---|---|
| CN | 1446436 A | 10/2003 |
| DE | 19748372 A1 | 5/1999 |

(Continued)

OTHER PUBLICATIONS

International Search Report and Written Opinion—PCT/US2009/041037, International Search Authority—European Patent Office—Dec. 18, 2009.

(Continued)

*Primary Examiner* — Timothy Pham
(74) *Attorney, Agent, or Firm* — Arnold J. Gum

(57) ABSTRACT

The subject matter disclosed herein relates to a system and method for reducing an initial position uncertainty of a mobile station. In one example, although claimed subject matter is not so limited, a process to improve an initial position estimate comprises identifying the locations of a serving cell and at least one other landmark proximate to a receiver and determining an initial estimate of the location of the receiver based, at least in part, on the identified locations of the serving cell and the at least one other landmark.

15 Claims, 5 Drawing Sheets

(56) References Cited

U.S. PATENT DOCUMENTS

| | | |
|---|---|---|
| 7,127,257 B2 | 10/2006 | Riley et al. |
| 7,130,646 B2 | 10/2006 | Wang |
| 7,245,255 B2 | 7/2007 | Van Diggelen et al. |
| 7,254,402 B2 | 8/2007 | Vayanos et al. |
| 7,254,404 B2 | 8/2007 | Van Diggelen et al. |
| 7,277,054 B2 | 10/2007 | Alanen et al. |
| 7,466,986 B2 | 12/2008 | Halcrow et al. |
| 7,822,426 B1 * | 10/2010 | Wuersch .................... 455/456.1 |
| 8,299,960 B2 | 10/2012 | Rowitch et al. |
| 2004/0162085 A1 | 8/2004 | Han |
| 2005/0185610 A1 | 8/2005 | Cheon |
| 2006/0129317 A1 | 6/2006 | Farmer et al. |
| 2006/0170591 A1 | 8/2006 | Houri |
| 2006/0217130 A1 | 9/2006 | Rowitch |
| 2006/0240833 A1 * | 10/2006 | Kwon et al. .................. 455/440 |
| 2008/0004037 A1 | 1/2008 | Achlioptas et al. |
| 2008/0090587 A1 | 4/2008 | Krause et al. |
| 2008/0091347 A1 * | 4/2008 | Tashiro ........................ 701/210 |
| 2009/0005070 A1 * | 1/2009 | Forstall et al. ............. 455/456.1 |
| 2009/0215427 A1 * | 8/2009 | Hawkins .................... 455/404.2 |
| 2013/0002483 A1 | 1/2013 | Rowitch et al. |
| 2013/0009810 A1 | 1/2013 | Rowitch et al. |

FOREIGN PATENT DOCUMENTS

| | | |
|---|---|---|
| EP | 1059510 A1 | 12/2000 |
| EP | 1237009 A2 | 9/2002 |
| JP | 11004474 A | 1/1999 |
| JP | 2001133535 A | 5/2001 |
| JP | 2002503932 A | 2/2002 |
| JP | 2002202356 A | 7/2002 |
| JP | 2004523153 A | 7/2004 |
| JP | 2004254292 A | 9/2004 |
| JP | 2004530101 T | 9/2004 |
| JP | 2004279314 A | 10/2004 |
| JP | 2005536110 A | 11/2005 |
| WO | 9941927 A2 | 8/1999 |
| WO | WO0213562 A1 | 2/2002 |
| WO | 02052873 A2 | 7/2002 |
| WO | 03032665 A1 | 4/2003 |
| WO | 2004016032 A1 | 2/2004 |
| WO | 2007056738 A2 | 5/2007 |

OTHER PUBLICATIONS

European Search Report—EP12007357—Search Authority—Munich—Feb. 13, 2013.
Lamance J. et al., "Assisted GPS: A Low-Infrastructure Approach", GPS World, Mar. 2002.
Taiwan Search Report—TW098113048—TIPO—Jul. 9, 2012.

* cited by examiner

SYSTEM AND/OR METHOD FOR REDUCING INITIAL POSITION UNCERTAINTY IN SPS OPERATION

TECHNICAL FIELD

The disclosed system and method relate generally to positioning systems for wireless user equipment.

BACKGROUND

A satellite positioning system (SPS), such as the Global Positioning System (GPS), typically comprises a system of earth orbiting satellite vehicles (SVs) enabling user equipment (UE) such as cellular telephones, personal communication system (PCS) devices, and other mobile stations (MSs) to determine their location on the earth based, at least in part, on signals received from the SVs.

An SPS user can derive precise navigation information including three-dimensional position, velocity and time of day through information gained from the SVs. Reception of signals from four SVs enables precise position determination in four dimensions (latitude, longitude, altitude, and time). However, one disadvantage of a particular SPS system for location determination is the relatively long time needed to perform signal acquisition under certain conditions. SV signals cannot be acquired until they have first been located by searching in a two-dimensional search "space," whose dimensions are code-phase delay and observed Doppler frequency shift. Typically, if there is no prior knowledge of a signal's location within this search space, as would be the case after a receiver "cold start," a large number of code delays and frequencies may be searched for each SV signal that is to be acquired and tracked. These locations are examined sequentially, a process that can take several minutes in a conventional SPS receiver.

A SPS receiver acquires signals from SVs whenever the receiver has lost reception, such as, after power down, or when the signal has been blocked from the receiver for some period of time. Assuming a fixed sensitivity threshold, the time spent acquiring the SV signals is typically proportional to a total search space derived from a product of time and frequency uncertainty. The signal re-acquisition delay may take tens of seconds if the search space is large.

In order to reduce this delay, information may be provided to aid an SPS receiver in acquiring a particular signal. The goal of such SPS assistance information is to permit a wireless mobile station (MS) to predict the time of arrival, or code phase, of a particular SV signal, and the Doppler shift of the SV signal. If the MS is provided with an initial reference position that is within an area of predefined size, such as a particular cellular coverage, then the total search space can be reduced to that consistent with the predefined size.

However, assisted position location systems depend upon communication with an external entity. Such communication suffers from connection and messaging latency, consumes additional power and consumes additional communication system bandwidth that impacts the overall capacity.

SUMMARY

Disclosed is a method for reducing an initial position uncertainty of a mobile station including identifying locations of a serving cell and at least one other landmark proximate to a receiver and determining an initial estimate of a location of said receiver based, at least in part, on said identified locations. One or more received signals may then be processed based, at least in part, on the initial estimate to obtain a more precise estimate.

In another aspect, a method for updating a position database maintained in a mobile station includes estimating a position of a mobile station based, at least in part, on one or more signals received at the mobile station contemporaneously with communicating with a serving cell, and updating a location of at least one landmark other than the serving cell in the position database maintained in the mobile station. An initial estimate of a location of the mobile station may be determined by combining the location information associated with the serving cell and the estimated location of the at least one landmark.

It should be understood, however, that these are merely particular examples of methods disclosed and discussed throughout, and that claimed subject matter is not limited to these particular examples.

BRIEF DESCRIPTION OF THE DRAWINGS

Non-limiting and non-exhaustive aspects of the system and method for reducing initial position uncertainty of a mobile station will be described with reference to the following figures, wherein like reference numerals refer to like parts throughout the various figures unless otherwise specified.

DETAILED DESCRIPTION

Figure 1:
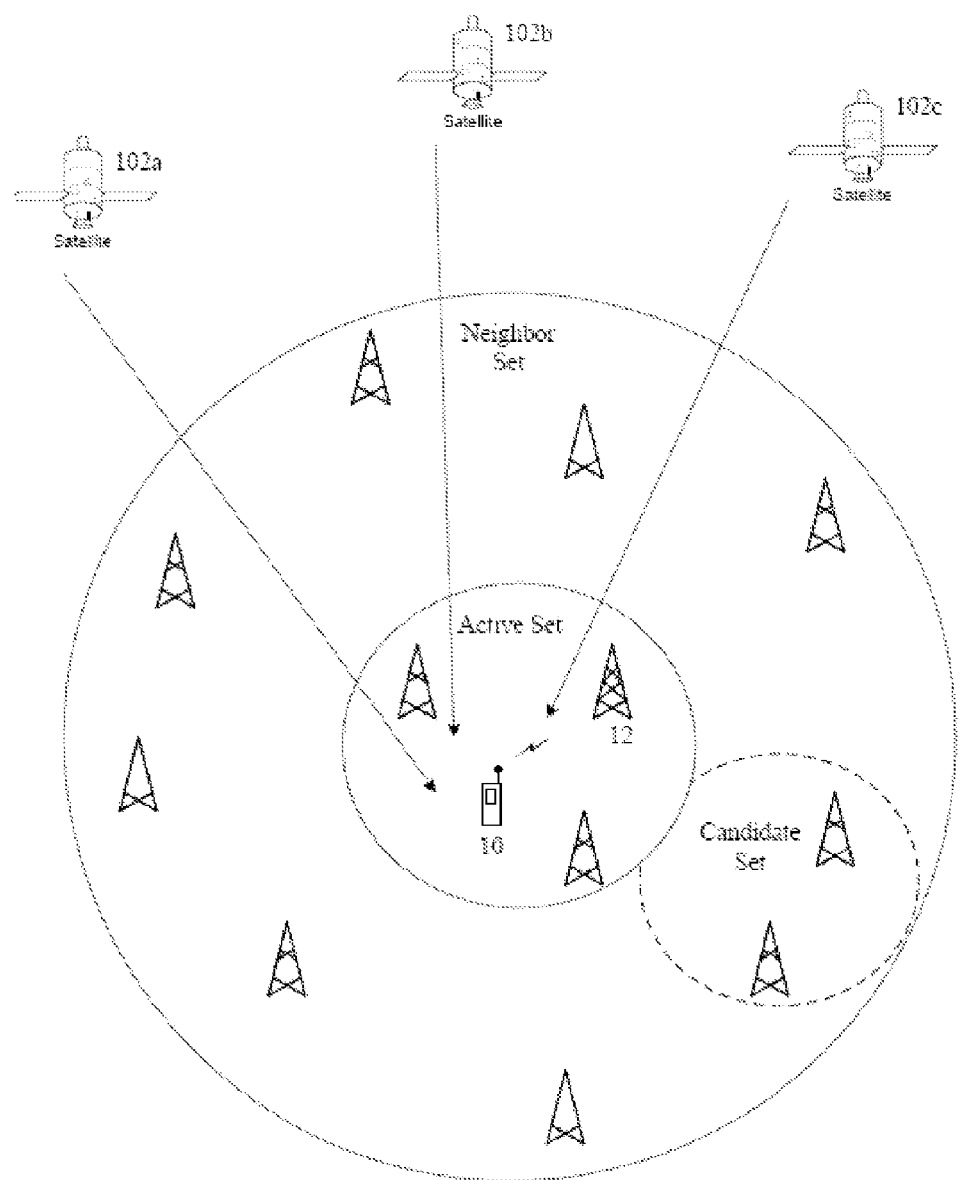
FIG. 1 is a schematic diagram illustrating an example mobile station (MS) communicating with a base station.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one aspect" or "an aspect" means that a particular feature, structure, or characteristic described in connection with the aspect is included in at least one aspect of claimed subject matter. Thus, the appearances of the phrase "in one aspect" and/or "an aspect" in various places throughout this specification are not necessarily all referring to the same aspect. Furthermore, the particular features, structures, and/or characteristics may be combined in one or more aspects of the system and method disclosed herein.

The methodologies described herein may be implemented by various means depending upon applications according to particular aspects. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or a combination thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile, or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "weighting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

A "space vehicle" (SV) as referred to herein relate to an object that is capable of transmitting signals to receivers on the earth's surface. In one particular aspect, such an SV may comprise a geostationary satellite. Alternatively, an SV may comprise a satellite traveling in an orbit and moving relative to a stationary position on the earth. However, these are merely examples of SVs and claimed subject matter is not limited in these respects.

A "location" as referred to herein relates to information associated with a whereabouts of an object or thing according to a point of reference. Here, for example, such a location may be represented as geographic coordinates such as latitude and longitude. Alternatively, such a location may be represented as a street address, municipality or other governmental jurisdiction, postal zip code and/or the like. However, these are merely examples of how a location may be represented according to particular aspects and claimed subject matter is not limited in these respects. The terms "location" and "position" are synonymous terms that may be used interchangeably herein.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

The system and method described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed system and method may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

The term "mobile station" is used herein to describe any type of equipment with position location capability and is not to be limited to any particular type of hardware. The mobile station may be a component of a remote terminal in a wireless communication system, such as a cellular telephone or a computer with a wireless modem. Alternatively, the mobile station may be a stand-alone unit, such as a stand-alone GPS unit. For example, the mobile station may be a cellular phone that may have any number of communication modes (e.g., GSM, CDMA, digital AM or FM radio, digital TV, TDMA, WCDMA, OFDM, GPRS, EVDO, WiFi, Bluetooth, WiMAX, UWB, satellite phone or data, etc.) to transfer voice and/or data with cellular, satellite and/or mesh networks by way of their base stations. The mobile station may also be a tracking device, a child or parolee monitor, navigational device, wireless pager, wireless computer, etc.

As used herein, the terms "cellular identifications" or "cellular identification" in general refers to not only "cell ID," but other identifications as well. A base transmitting station (BTS) adapted for GSM, UMTS, and GPRS protocols, for example, has a unique cell ID. For GSM protocol, a "Cell Global Identity" may be associated with a three-digit Mobile Country Code (MCC) that uniquely identifies a country, a two or three digit Mobile Network Code (MNC) that uniquely identifies a cellular network within a given MCC, a two byte Location Area Code (LAC) that uniquely identifies a location area within a Public Land Mobile Network (PLMN), and a two byte Cell Identity (CI) that identifies a particular cell. It will be apparent to those of skill in the art that a "cell ID" need not be defined in precisely the manner of the GSM protocol, and an endless variety of components could make up a unique cell ID and still function in the same way to produce similar results and claimed subject matter is not limited in this respect.

FIG. 1 illustrates an example mobile station (MS) 10 with SPS capabilities communicating with a serving base station 12. Base station 12 may comprise a base transmitting station (BTS) in GSM protocol or a "node B" in UMTS protocol, for example. MS 10 may receive transmissions from SVs 102a, 102b, 102c in "view" MS 10.

MS 10 may operate within a Code Divisional Multiple Access (CDMA) system, for example, wherein service regions may be partitioned into small areas referred to as cells and the same frequency is reused in different cells in order to make efficient use of frequency resources. Within each cell, there may be a base station such as base station 12, which includes an antenna for communicating with communications systems serviced by the base station. In a CDMA communication system, a base station may transmit a pilot signal having a common pseudorandom (PN) spreading code that is offset in code phase from the pilot signal of other base stations. Thus, the PN offsets differentiate the base stations in the communication system and allow the pilot signals to be distinguished from one another by a mobile station. Among other uses, the pilot signals may be used for handoff which is a process by which a network of base stations and the mobile station maintain their communication when the mobile station travels from one coverage area to another. When the mobile station moves into a coverage area, for example, the mobile station may be provided with a list of all base stations that are in the communication system. During system operation, the mobile station may continually search for pilot signals of the base stations that are on the list and track, for example, signal quality indicators such as signal strength, signal to noise ratio, or signal to noise interference ratio, of the pilot signals to create a list of possible candidate pilot signals for future handoff when signal quality degrades below a predetermined threshold. To streamline the process of searching for strong pilot signals, the list of pilot signals may be grouped into sets of predetermined priority: an Active Set, a Candidate Set, and a Neighbor Set. The Active Set may comprise a set of base stations through which active communication with the mobile station is established. Active communication refers to the fact that the mobile station is registered with the network and can be identified by the base station. Even if a mobile station is not in active communication with a base station, the mobile station may receive pilots, pages, and/or other signaling messages from the base station. It should be understood that receiving a pilot signal from a base station does not necessarily indicate active communication between the base station and the mobile station. The Candidate Set may comprise a set of base stations for which the pilot signals have been received at the mobile station with sufficient strength to make them members of the Active Set, but have not been placed in the Active Set. The Neighbor Set may comprise a set of base stations which are likely candidates for establishing communication with the mobile station.

MS 10 may communicate with any number of base stations to obtain location information. Each base station may provide communication for a respective coverage area or cell. The term "cell" may refer to a base station and/or its coverage area. To increase system capacity, the coverage area of each base station may be partitioned into sectors. The term "base station" as used herein may refer to a base station that serves a cell and/or a base station that serves a sector. Once the location of the BTS is known, then the approximate location of the MS may be known to be somewhere within the coverage area of that BTS, or the uncertainty region. The accuracy of this method of determining the approximate MS position may depend in part on the cell size, or coverage area, and can be poor in many cases because a typical GSM cell, for example, ranges between two kilometers and thirty two kilometers in radius. Thus, not only may the precise location of the MS within a particular coverage area be unknown, but the radius of one coverage area is also unlikely to be the same as that of another.

As illustrated in FIG. 1, MS 10 may communicate with BTS 12 because MS 10 is located in the coverage area of BTS 12. If a serving antenna of BTS 12 operates directly from this base station (for example, there is no repeater in the communication path), then an appropriate first estimation of the coverage area of BTS 12 may be a circle of radius R centered at the serving antenna of BTS 12. That is, in this particular example, the coverage area may define such an uncertainty of the location of MS 10 within this coverage area, also referred to as the "uncertainty region." It will be apparent to those skilled in the art that the coverage area is not necessarily circular as illustrated in FIG. 1 according to a particular example for the purpose of illustration, but may also comprise a sector shape for a base station coverage area that has been partitioned into sectors. It will be further apparent to those skilled in the art that the coverage area may be determined by irregularities in the surrounding terrain and the effects of buildings, vegetation, and other signal attenuators present in the area of the cell.

An initial position of a mobile station (MS) may be estimated using knowledge of a location of a base station "serving" the MS (e.g., where the serving base station or serving cell is in active communication with the MS). That is, the MS may be determined to be within a known limited radius of the serving cell since the two are in communication. The position of the MS may then be estimated to be, for example, the center of the coverage area of the serving cell, the serving cell antenna location, a default location, or some other location associated with the location of the serving cell.

In one aspect, an initial estimate of the position of the MS may be improved by combining location information associated with the serving cell with location information associated with one or more other landmarks such as, for example, locations of base stations associated with other cells in the Active, Neighbor, and Candidate (ANC) Set in the communication system. In one example, weighting factors may be applied to locations of different landmarks to be combined in providing an initial estimate of the MS. Here, for example, a weight may be applied to a particular landmark location based, at least in part, on whether associated landmark is a base station of a serving cell or another cell in an ANC. associated with an uncertainty of the estimate may be assigned according to whether location information is generated when a cell was the serving cell.

In this context, "landmark" refers to any object that is at a fixed location on the Earth. It should also be understood that base stations associated with such cells in a communication network are merely particular examples identified for the purpose of illustration and that claimed subject matter is not limited in this respect.

Figure 2:
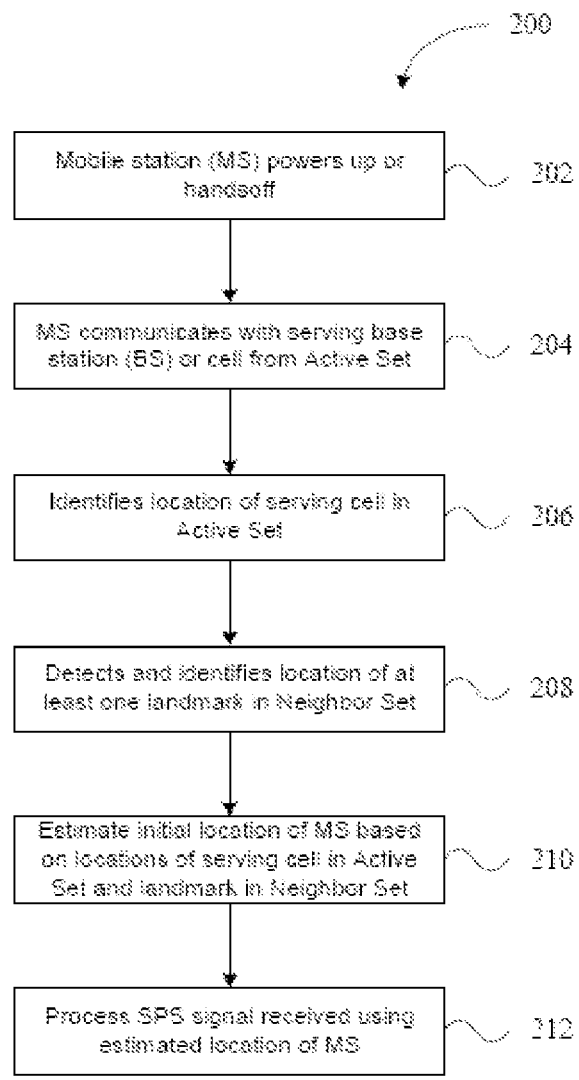
FIG. 2 is a flow diagram illustrating a process for reducing an initial position uncertainty of an MS.

FIG. 2 is a flow diagram illustrating a process 200 for reducing an initial position uncertainty of an MS such as MS 10 of FIG. 1, for example. In one aspect, the process 200 may be performed by an MS comprising a receiver to receive SPS signals from SVs, for example. Here, the estimated position with reduced uncertainty may then be used to process SPS signals from SVs to obtain a more precise estimate of the location of the MS. In alternative embodiments, such an initial position a receiver of such an MS may be capable of determining its position based, at least in part, on measurements of ranges to transmitters at known locations. For example, such measurements of ranges may be based, at least in part, on time differences associated with signals received from different sources at known locations, strength of signals received from one or more sources at known locations and/or round trip times of signals transmitted between an MS and a known location. Here, the estimated position with reduced uncertainty may be used in determining such measurements of ranges.

Process 200 may commence at 202 in response to any one of several events such as, for example, when an MS powers up, is handed off from one serving base station to another, or encounters some form of reselection event. Block 204 may comprise communicating with a serving cell. Block 206 may comprise identifying a location of the serving cell, and block 208 may further comprise detecting and identifying the location of at least one other landmark among the Neighbor Set of the serving cell and proximate to an MS. In this context, "proximate" suggests a degree of nearness or closeness between an MS and a landmark in that a known location of the landmark is relevant to determining or estimating a location of the MS. In a particular example, an MS may be proximate to a base station if the MS is capable of detecting a pilot signal transmitted by the base station. In another example, an MS may be proximate to a landmark if both the MS and the landmark are determined to be in the same country. It should be understood, however, that these are merely examples of how an MS may be proximate to a landmark according in specific examples and that claimed subject matter is not limited in this respect.

In a particular example of processing at block 206. The at least one other landmark may comprise, for example, at least one cell from a plurality of cells neighboring the serving cell. As illustrated in FIG. 1 according to a particular example, the at least one other landmark may comprise at least one cell from the ANC Set. Identifying the locations of a serving cell and at least one other landmark may comprise receiving identifiers associated with the serving cell and the at least one other landmark, and associating position information with the respective identifiers. Here, an MS may determine from the communication signals transmitted from the serving cell the serving cell's location or identity. This may be possible, for example, in cellular communications systems in which the MS can detect a data signal in the cellular transmission which identifies the cell site or the cellular service area which contains the cell site. For example, in IS-95 CDMA standard, the cell site transmission includes the cell site identity as well as its latitude and longitude. In CDMA, there is also a unique cell site identifier which may be sent to the MS. However, this is merely one example of how an MS may determine a unique identifier associated with a cell site and claimed subject matter is not limited in this respect. In one aspect, an MS may deduce that a landmark (e.g., a cell or base station) is close or proximate to MS 10 in response to receiving a signal from the landmark. Accordingly, position information associated with such identifiers may be used to estimate a location of an MS given that signal from the serving cell and the at least one other landmark is received by the MS. In block 210, an initial estimate of a location of the MS may then be determined based, at least in part, on the identified locations of the serving cell and the at least one other landmark.

Determining the initial estimate of the location of the MS 10 may comprise combining and/or weighting the position information associated with the serving cell and the at least one other landmark. Alternatively, such an estimate may be derived from a least mean square error estimate, just as an example. Here, a weight may be applied to position information associated with the serving cell or other landmark based, at least in part, on a certainty in the position information and/or status of the landmark. For example, position information associated with a landmark may be weighted higher if the uncertainty of the position information is less than the uncertainty of other position information that is to be combined in determining the initial estimate of the location of the MS. In a particular example, a base station of a serving cell may be presumed to be likely closer to an MS than base stations associated with other cells among an ANC set. Accordingly, in determining an initial position of the MS by combining position information associated with a base station of a serving cell and position information associated with another base station among an ANC set, position information associated with a base station of a serving cell may be more heavily weighted.

Block 212 may comprise processing one or more SPS signals (e.g., from one or more Global Navigation Satellite System (GNSS) transmitters) for determining more precise estimate of location based, at least in part, on the initial estimate of the location of the MS 10. Again, in alternative embodiments as illustrated above, such an initial position of an MS may be used in processing other types of signals received at the MS for measuring ranges to transmitters at known locations.

Figure 3:
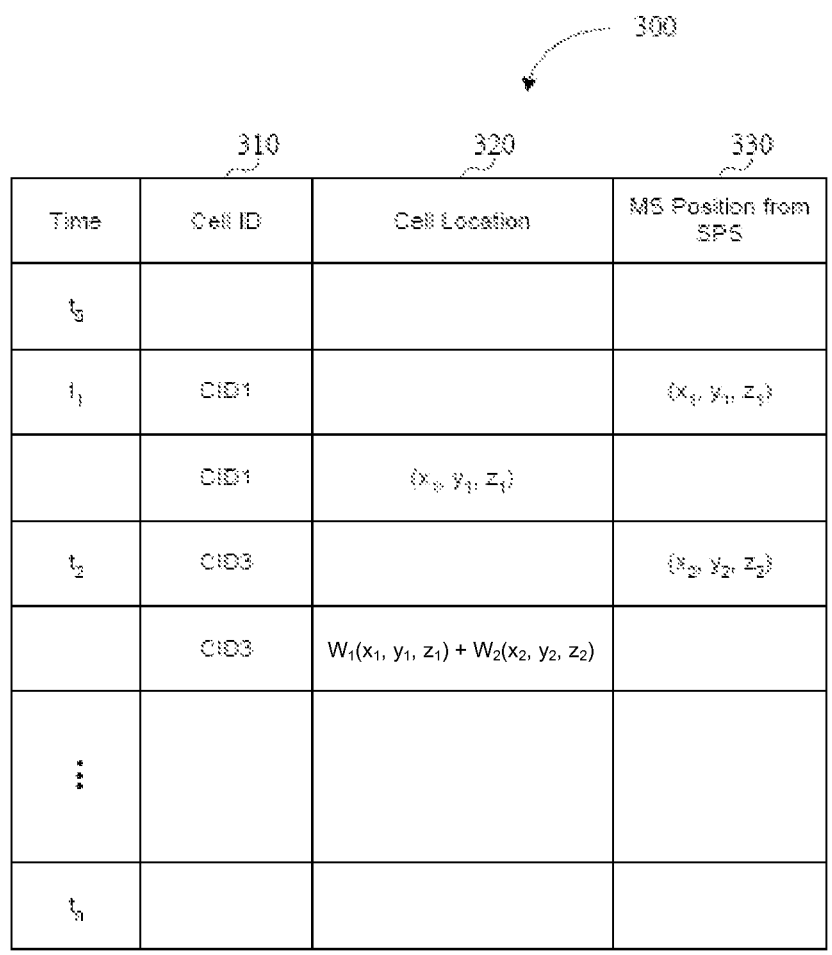
FIG. 3 is a schematic diagram of a position database stored and maintained in an MS.

In one particular example, although claimed subject matter is not limited in this respect, process 200 may obtain position information associated with a base station of a serving cell and other base stations associated with cells in an ANC Set may be stored in a database such as position database 300 shown in FIG. 3. In a particular example database 300 may be stored and maintained in a memory of an MS. Position database 300 may include location information associated with base stations of cells in a complete Active, Neighbor, and Candidate (ANC) Set in the communication system with corresponding uncertainties. Position database 300 may include a column 310 specifying a cell ID, a column 320 specifying a cell ID location, and a column 330 specifying MS position derived using SPS. It will be appreciated by those of skill in the art that the information stored and updated in the position database 300 need not be in the form or format shown in FIG. 3, but can be stored and updated in any manner that is relevant or useful to the system and method described herein.

In one particular example, information in position database 300 may be determined and/or maintained based, at least in part, upon position information obtained at an MS by, for example receipt of SPS signals. Here, upon estimating a position of an MS based, at least in part, on SPS signals received and processed at the MS, such estimates may be associated with locations of landmarks proximate to the MS such as, for example, a base station associated with a serving cell or other cells in an ANC Set. Accordingly, such an estimated position of an MS may be used to update an estimate of a position of a landmark in database 300. Here, for example, such an estimated position of a landmark may be updated by combining a current estimate of a position of a landmark with an estimated position of the MS. Here, for example, the current estimate of the position of the landmark may be weighted relative to the estimated position of the MS based, at least in part, on an uncertainty associated with the current estimate and the estimate of the position of the MS.

In one example, if an MS estimates its location $(x_1, y_1, z_1)$ in Earth-centered coordinates at time $t_1$ while cell ID 1 (CID1) is the serving cell and CID2, CID3, and CID4 are in the ANC Set, then the position database 300 may be updated to indicate a location $(x_1, y_1, z_1)$ for CID1. Also, estimates of locations for CID2, CID3 and CID4 which, again, are in the ANC Set, may also be updated in database 300 to $(x_1, y_1, z_1)$. However, since CID2, CID3 and CID4 are not serving cells, estimates of these locations may be associated with a larger uncertainty than that of the estimated location of CID1. If, at time $t_2$, the MS generates a location $(x_2, y_2, z_2)$ while CID3 is the serving cell. In one implementation, an estimate of the location of CID3 in database 300 may be updated to indicate a location $(x_2, y_2, z_2)$ for CID3. Alternatively, such an estimate of the location of CID3 may be updated as a weighted combination of $(x_1, y_1, z_1)$, the estimated location at time $t_1$, and the more recently obtained estimate $(x_2, y_2, z_2)$. Here, since $(x_2, y_2, z_2)$ is obtained while CID3 is the serving cell, location $(x_2, y_2, z_2)$ may be given a heavier weight in such a weighted combination. In one example, position database 300 may indicate that such an estimate of location of CID3 was obtained while CID3 was associated with a serving cell. Accordingly, in future use of such an estimated location of CID3 (e.g., location $(x_2, y_2, z_2)$ or weighted combination of locations $(x_1, y_1, z_1)$ and $(x_2, y_2, z_2)$) as an estimate of the location for CID3, an appropriate amount of uncertainty may be attributed to such an estimate of location for CID3.

In another aspect, an existing or current estimate of a location in position database 300 may be updated with an estimate of location of an MS. Here, such an estimate of location of an MS may be combined with such an existing or current estimate of a location of a base station (e.g., identified by CID3) while the base station is associate with a serving cell. Here, an update estimate of location of the base station may comprise, for example, a weighted combination of the existing or current estimate of the location of the base station and the estimate of the location of the MS. Thus, continuing with the particular example outlined above, an estimate of location for CID3 $(x_2, y_2, z_2)$ may be updated, for example, as $W_3(x_3, y_3, z_3) + W_2(x_2, y_2, z_2)$ where:

$$W_3 + W_2 = 1; \text{ and}$$

$(x_3, y_3, z_3)$ is the estimated location of the MS obtained while CID3 is a serving cell.

In alternative embodiments, an estimate of a location of an MS may be used to determine and/or update estimates of locations of base stations while among the ANC Set other than the serving cell. Here, for example, such an estimate of location of an MS may be weighted less heavily when being used to update a location of base station (other than the base station of the serving cell) while among the ANC Set.

The position information provided by the position database 300 thereby may reduce a degree of search uncertainty associated with acquisition of an SPS signal. As such, an MS may acquire SPS signals faster and using less processing resources, thereby allowing lower power consumption and reduced form factor.

Figure 4:
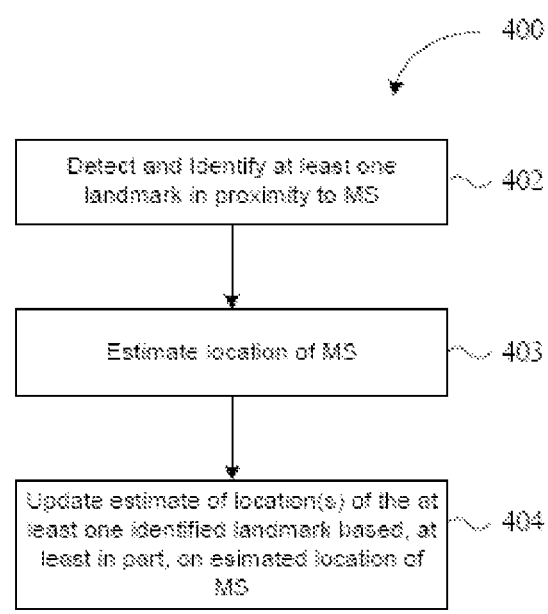
FIG. 4 is a flow diagram illustrating a process for updating the position database.

FIG. 4 is a flow diagram illustrating a process 400 for updating a position database such as position database 300 shown in FIG. 3. In block 402, an MS may identify and detect one or more landmarks in proximity to the MS. In a particular example, this may comprise detecting a pilot signal from a base station of a serving cell or other base station associated with a cell in an ANC Set as illustrated above. Contemporaneously with detection and identification with one or more landmark, an MS may estimate its location by, for example, processing one or more SPS signals received at the MS or using other techniques illustrated above. Here, "contemporaneous" refers to a difference in time between occurrences of events such that the location of the MS does not change significantly relative to positions of landmarks. In the particularly illustrated example, following detection and identification of one or more landmarks at block 402, block 404 may estimate a location of the MS. In an alternative implantation, however, estimation of location of an MS may occur simultaneous with or before detection and identification of at least one landmark at block 402. Finally, estimates of locations of the at least one identified landmark are updated based, at least in part, on the estimate of the location of the MS obtained at block 404.

Figure 5:
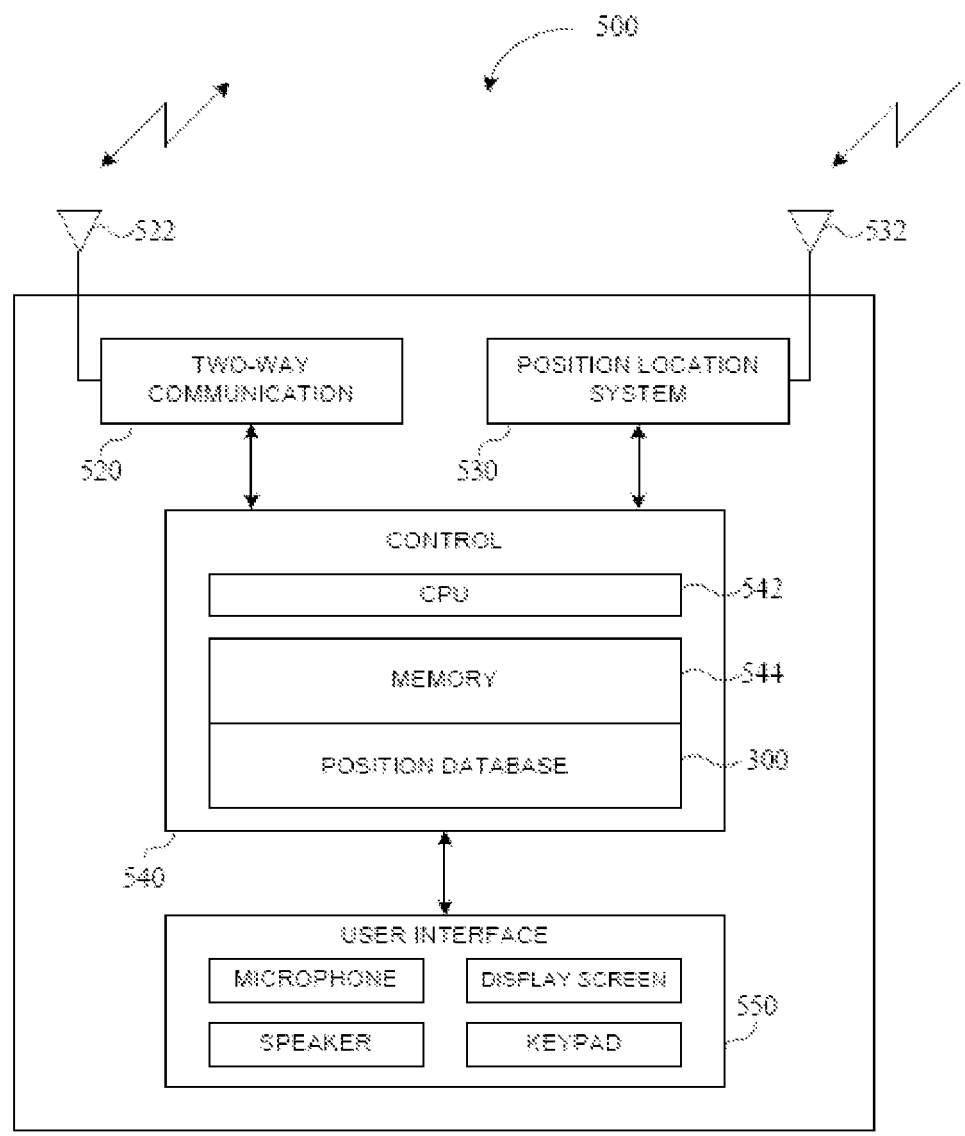
FIG. 5 is a schematic diagram of a MS according to one aspect of the system and method disclosed herein.

Referring to FIG. 5, a diagram illustrates components of a mobile station according to a particular example. Mobile station 500 includes a two-way communication system 520, such as but not limited to a cellular communication system, which transmits and receives signals via antenna 522. The communication system 520 may include a modem adapted to process information for communication in one or more of the aforementioned networks. Mobile station 500 includes a position location system 530, such as a Satellite Positioning System (SPS) receiver that receives SV signals via antenna 532. The modem and SPS receiver may communicate with one another, and such communication may include, for example, the MS cellular identification, estimates of time and/or location, frequency, and other radio information. Mobile control 540 may comprise a central processing unit (CPU) 542 and associated memory 544, hardware, software, and firmware. It will be understood as used herein that the CPU 542 can, but need not necessarily include, one or more microprocessors, embedded processors, controllers, application specific integrated circuits (ASICs), digital signal processors (DSPs), and the like. The term CPU is intended to describe the functions implemented by the system rather than specific hardware. A position database 400 may be stored and maintained in memory 544. Memory 544 may comprise one or more types of storage media identified above. A user interface 550 may allow a user to enter information into and receive information, such as voice or data, from MS 500. The user interface 550 may include, for example, a keypad, a display screen, a microphone, and a speaker.

While there has been illustrated and described what are presently considered to be example aspects, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular aspects disclosed, but that such claimed subject matter may also include all aspects falling within the scope of the appended claims, and equivalents thereof.

The invention claimed is:

1. A method, comprising:
estimating a location of a mobile station based, at least in part, on one or more satellite positioning system (SPS) signals received at said mobile station contemporaneously with communicating with a serving cell;
updating an estimated location of at least one landmark other than said serving cell in a database maintained at said mobile station based, at least in part, on said estimated location of said mobile station, wherein a landmark comprises an object at a fixed location;
detecting presence of the at least one landmark in proximity to the mobile station; estimating the location of the at least one landmark based, at least in part, on said received SPS signals;
storing the estimated location of the at least one landmark in the database maintained at said mobile station;
combining the location information associated with the serving cell and the estimated location of the at least one landmark; and
determining an initial estimate of the location of the mobile station based on the combined location information.

2. The method of claim 1, further comprising:
storing location information associated with the serving cell in the database maintained at said mobile station.

3. The method of claim 1, further comprising:
processing the one or more SPS signals based, at least in part, on the initial estimate of the location of the mobile station.

4. The method of claim 1, further comprising:
receiving location information associated with the serving cell and the at least one landmark from a remote database.

5. An article comprising a non-transitory storage medium comprising machine-readable instructions stored thereon which, when executed, are adapted to:
estimate a location of a mobile station based, at least in part, on one or more satellite processing system (SPS) signals received at said mobile station and contemporaneously communicate with a serving cell;
update an estimated location of at least one landmark other than said serving cell in a database maintained at said mobile station based, at least in part, on said estimated location of said mobile station, wherein a landmark comprises an object at a fixed location;
detect presence of the at least one landmark in proximity to the mobile station; estimate the location of the at least one landmark based, at least in part, on said received SPS signals;
store the estimated location of the at least one landmark in the database maintained at said mobile station;
combine the location information associated with the serving cell and the estimated location of the at least one landmark; and
determine an initial estimate of the location of the mobile station based on the combined location information.

6. The article of claim 5, wherein said machine-readable instructions, when executed, are further adapted to:
store location information associated with the serving cell in the database maintained at said mobile station.

7. The article of claim 5, wherein said machine-readable instructions, when executed, are further adapted to: process the one or more SPS based, at least in part, on the initial estimate of the location of the mobile station.

8. A mobile station, comprising:
a receiver to receive one or more satellite positioning system (SPS) signals, said mobile station being adapted to:
estimate a location of the mobile station based, at least in part, on the one or more signals received at said mobile station from one or more global navigation satellite system transmitters contemporaneously with communicating with a serving cell;
update an estimated location of at least one landmark other than said serving cell in a database maintained at said mobile station based, at least in part, on said estimated location of said mobile station, wherein a landmark comprises an object at a fixed location;
detect presence of the at least one landmark in proximity to the mobile station; estimate the location of the at least one landmark based, at least in part, on said received SPS signals;
store the estimated location of the at least one landmark in the database maintained at said mobile station;
combine the location information associated with the serving cell and the estimated location of the at least one landmark; and
determine an initial estimate of the location of the mobile station based on the combined location information.

9. The mobile station of claim 8, wherein said mobile station is further adapted to store location information associated with the serving cell in the database maintained at said mobile station.

10. The mobile station of claim 8, wherein said mobile station is further adapted to process the one or more SPS signals based, at least in part, on the initial estimate of the location of the mobile station.

11. The mobile station of claim 10, wherein said mobile station is further adapted to determine uncertainty of location information associated with the serving cell and the at least one other landmark.

12. A mobile station comprising:
means for estimating a location of a mobile station based, at least in part, on one or more satellite positioning system (SPS) signals received at said mobile station contemporaneously with communicating with a serving cell;
means for updating an estimated location of at least one landmark other than said serving cell in a database maintained at said mobile station based, at least in part, on said estimated location of said mobile station, wherein a landmark comprises an object at a fixed location;
means for detecting presence of the at least one landmark in proximity to the mobile station;
means for estimating the location of the at least one landmark based, at least in part, on said received SPS signals;
means for storing the estimated location of the at least one landmark in the database maintained at said mobile station;
means for combining the location information associated with the serving cell and the estimated location of the at least one landmark; and
means for determining an initial estimate of the location of the mobile station based on the combined location information.

13. The mobile station of claim 12 further comprising:
means for storing location information associated with the serving cell in the database maintained at said mobile station.

14. The mobile station of claim 12 further comprising:
means for processing the one or more SPS signals based, at least in part, on the initial estimate of the location of the mobile station.

15. The mobile station of claim 12 further comprising:
means for receiving location information associated with the serving cell and the at least one landmark from a remote database.

* * * * *